May 15, 1956  C. W. MERRILL  2,745,261
CONTINUOUS FREEZER
Filed Nov. 1, 1954  4 Sheets-Sheet 1
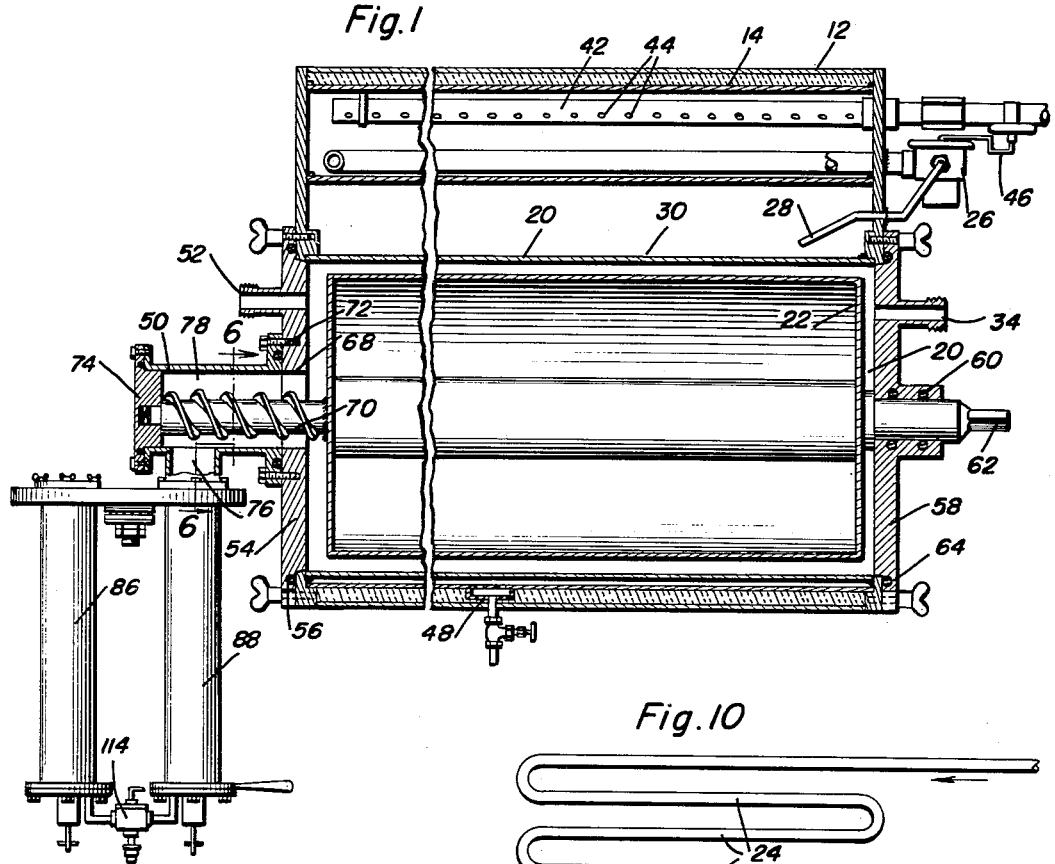
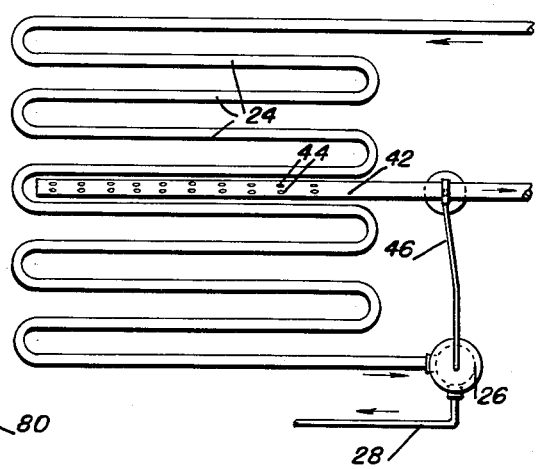
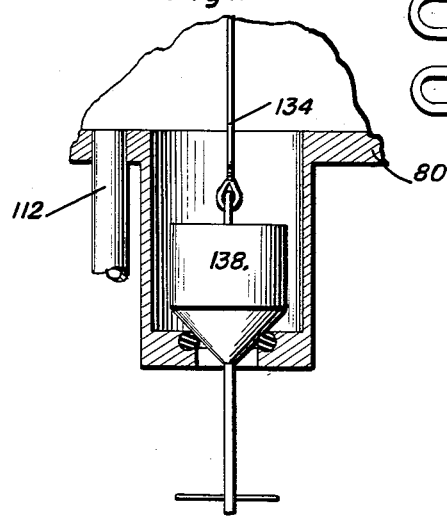
Casper W. Merrill
INVENTOR.
BY *Clarence A. O'Brien*
*and Harvey B. Jacobson*
Attorneys May 15, 1956 — C. W. MERRILL — 2,745,261
CONTINUOUS FREEZER
Filed Nov. 1, 1954 — 4 Sheets-Sheet 2

Casper W. Merrill
INVENTOR.

May 15, 1956
C. W. MERRILL
2,745,261
CONTINUOUS FREEZER
Filed Nov. 1, 1954
4 Sheets-Sheet 3
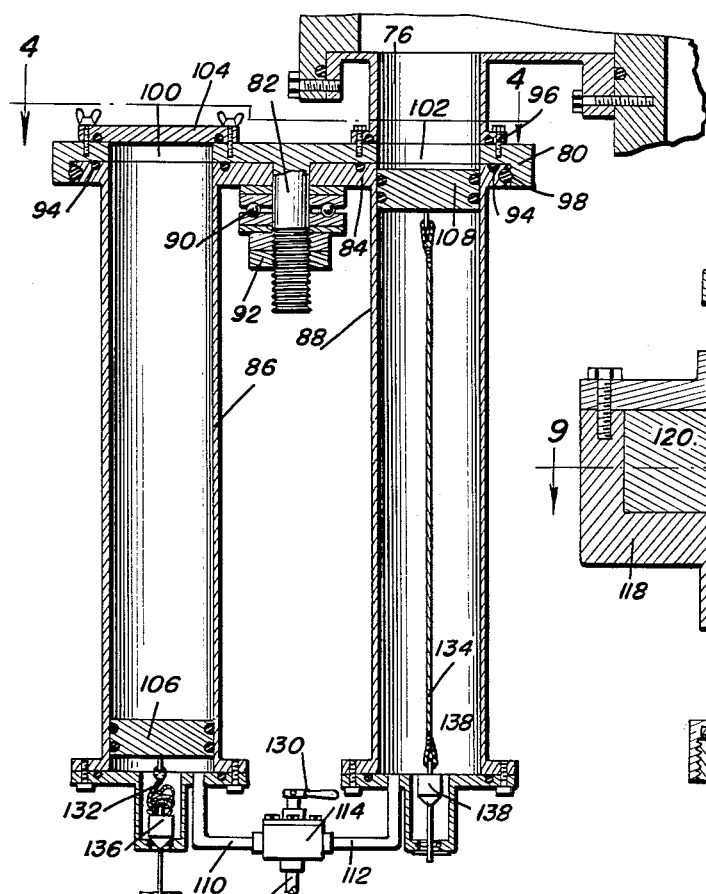
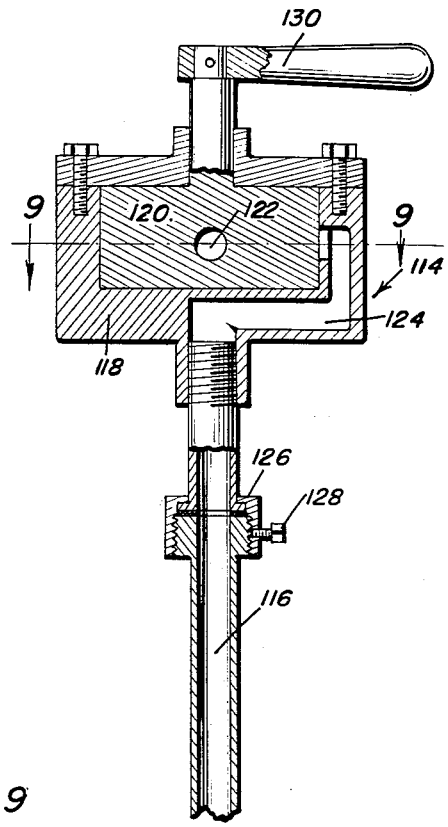
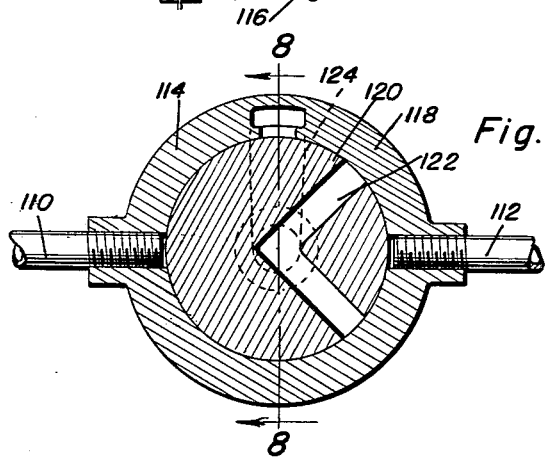
Casper W. Merrill
INVENTOR.

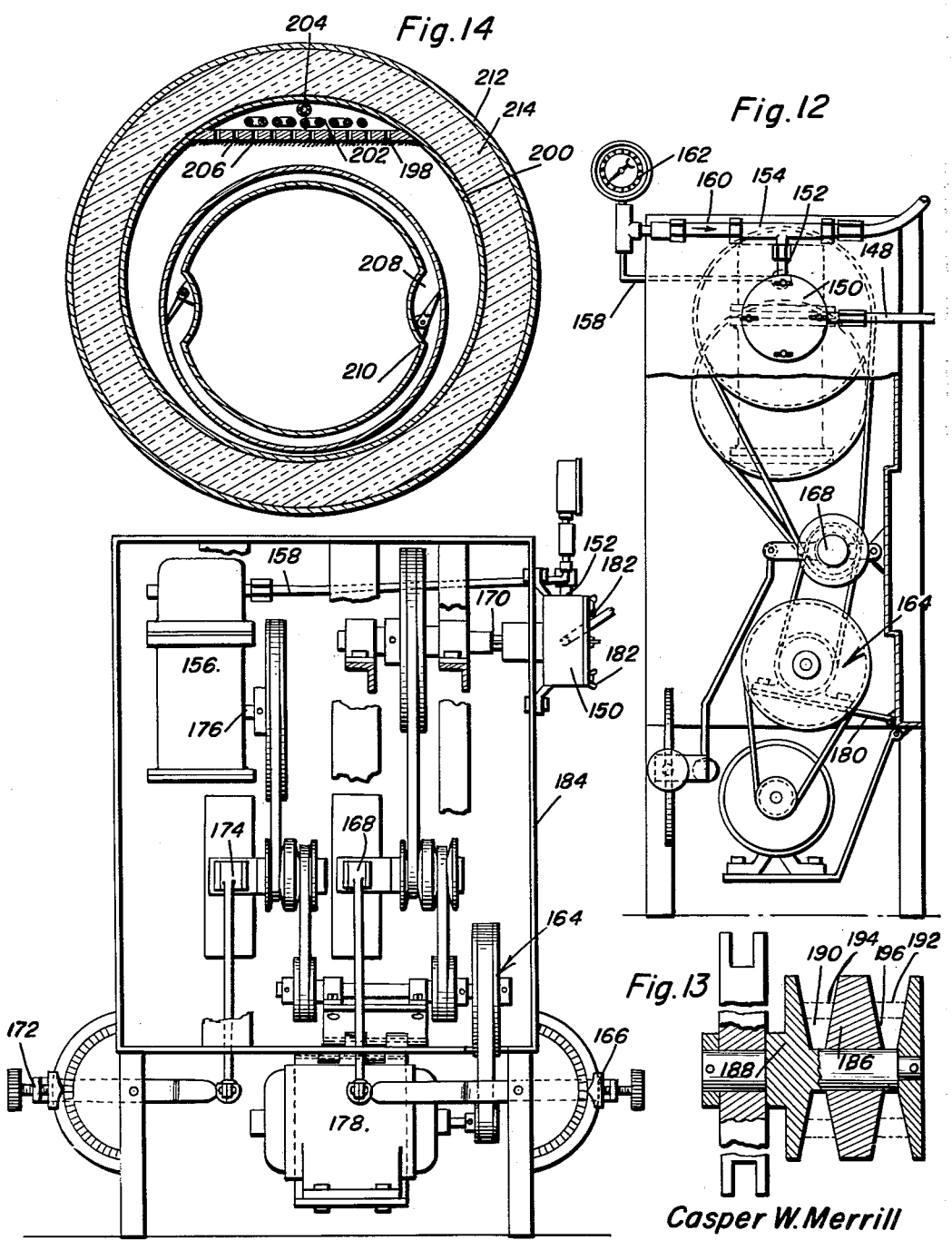

United States Patent Office 2,745,261
Patented May 15, 1956

2,745,261

CONTINUOUS FREEZER

Casper W. Merrill, Logan, Utah

Application November 1, 1954, Serial No. 466,028

11 Claims. (Cl. 62—114)

This invention relates to improvements in apparatus for continuous freezing of ice cream, ice milk, sherberts, ices and related products, and involves certain additions to the ice cream freezer converter, as disclosed in Patent No. 2,689,113 to Casper W. Merrill, issued September 14, 1954, for Continuous Freezer.

The primary object of the present invention resides in the provision of means for injecting fruits, nuts, flavoring and color into the freezer so as to be properly mixed and frozen before the ice cream is drawn from the freezer continuously.

Another object of the invention lies in the provision of means for reducing the surging of refrigerants by means of a baffle plate or screen which separates the main refrigerant casing from the dome portion.

One of the features of the invention lies in a novel refrigerant evaporator chamber which permits volatilized ammonia to rise freely through the liquid with a minimum of surging, thus preventing excessive amounts of liquid ammonia or other refrigerant from surging up into the dome of the freezer causing a frost back and the resultant misplaced refrigeration and inefficiency, due to the boiling over into the suction line of the liquid ammonia.

A further feature of the invention lies in the utilization of an independent pump unit adapted to be contained in a small cabinet driven by independent variable speed drives so as to enable the amount of air injected to be controlled entirely by the speed of the air pump and the amount of mix injected controlled entirely by the speed of the mix pump, with the speed of both the air pump and mix pump controlled independently of each other.

Another object of the invention lies in the provision of a novel fruit feeder in which the air or mix can be injected when the freezer is not running or the freezer can run and the air and mix pumps can be individually stopped.

Still further objects and features of this invention reside in the provision of a continuous freezer in which much faster freezing can be accomplished and a greater efficiency achieved while permitting a gentle action of fruit injection, this preventing a breaking up action that exists in line type of fruit feeders and wherein whole cherries can enter the ice cream as whole cherries and will not be broken up, while permitting the freezing of the fruit and proper mixing before it leaves the freezer, thus preventing temperature shock, partial melting and resultant coarse body.

Yet further objects and features of this invention lie in the simplicity of operation, inexpensive construction, less parts, thus saving time in assembling and disassembling for washing and cleaning, and which enables a superior product to be achieved by a lower drawing temperature and less friction within the freezer.

These, together with the various ancillary objects and features of the invention which will become apparent as the following description proceeds, are attained by this continuous freezer, a preferred embodiment of which has been illustrated in the accompanying drawings, by way of example only, wherein:

Figure 1 is a longitudinal sectional view as taken along the axis of the continuous freezer illustrated with the fruit injector comprising one of the important elements of the invention attached;

Figure 3 is a detail sectional view of the fruit injector as taken along the longitudinal axis thereof;

Figure 7 is an enlarged sectional detail view illustrating the construction of one of the check valves incorporated in the present invention;

Figure 8 is an enlarged sectional detail view of the three-way control valve;

Figure 9 is a horizontal sectional view, as taken along the plane of line 9—9 in Figure 8 and illustrating the construction of the control valve in further detail;

Figure 10 is a schematic illustration of the construction of the coils for refrigerant and associated elements;

Figure 11 is a view of the separate air and mix pumps and speed changer assembly shown with the lid removed, the lid being adapted to be used as a table for holding the parts of the invention while being washed and before reassembling;

Figure 12 is a sectional detail view further illustrating the air and mix pump and means for control thereof;

Figure 13 is a detail view illustrating the construction of the transmission operative to vary the speed of the mix pump; and Figure 14 is a sectional detail view of a modified form of continuous freezer.

Figure 2:
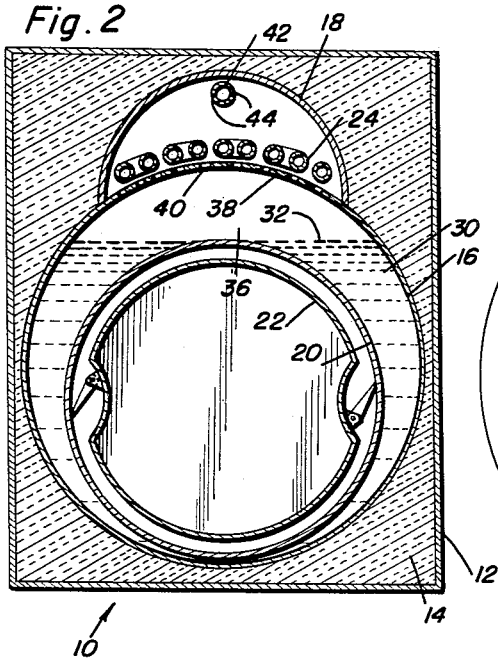
Figure 2 is a vertical sectional view of the continuous freezer showing the arrangement of the evaporating chamber, the baffle plates, dome and the heat interchanger arrangement.
Figure 4:
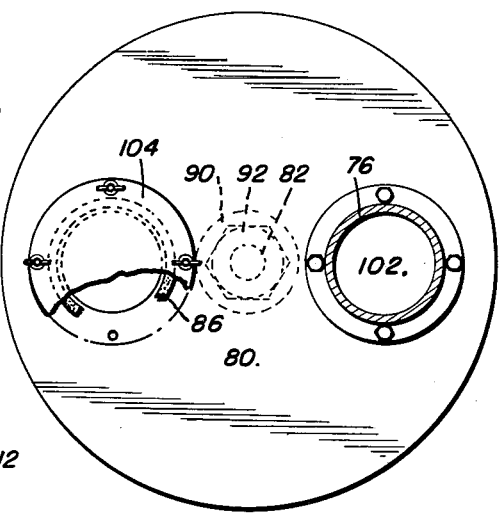
Figure 4 is a horizontal sectional view as taken along the plane of line 4—4 in Figure 3.
Figure 6:
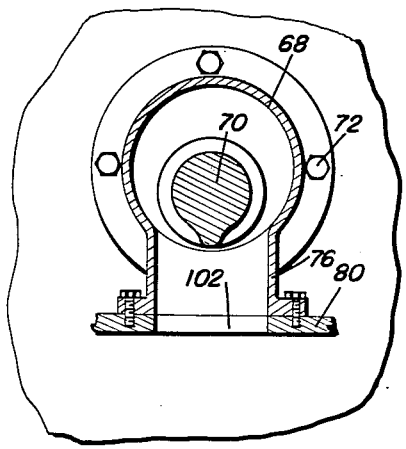
Figure 6 is an enlarged vertical sectional view as taken along the planes of line 6—6 of Figure 1.
Figure 5:
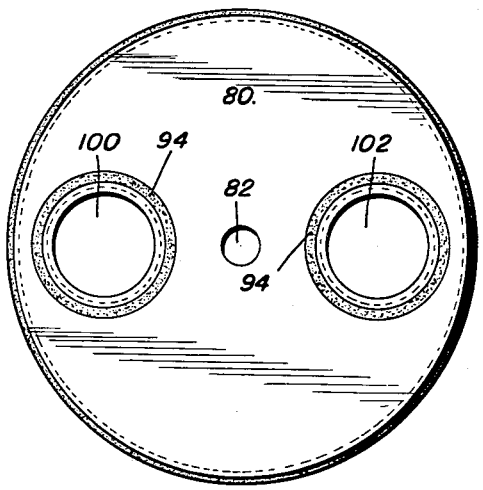
Figure 5 is a bottom plan view of the upper mounting plate for the fruit injector.

With continuing reference to the accompanying drawings wherein like reference numerals designate similar parts throughout the various views, reference numeral 10 generally designates the continuous freezing apparatus comprising the present invention. Encased in an outer housing 12 insulated as at 14 is the refrigerant casing 16 having a dome 18 appended thereon. This can be best seen in Figures 1 and 2.

Within the refrigerant casing 16 is a freezing chamber 20 having a rotating drum 22 mounted therein of a construction similar to that disclosed in the prior patent of Casper W. Merrill. The refrigerant, such as liquid ammonia, flows within the coils 24 in the dome 18 by entering the coils 24 at the back of the freezer 10. The liquid ammonia enters under a pressure of 150 lbs. to 175 lbs. at a temperature of 60° F. to 100° F. During passage through the coils 24, the liquid ammonia is cooled since the coils are in contact with cold moist vapor and subsequently, the liquid refrigerant enters the thermostatically controlled expansion or pressure reducing valve 26 through conduit 28 into the refrigerant chamber 30 formed by the space between the refrigerant casing 16 and the freezing chamber 20. The expansion valve 26 or such other type of controls as may be desired maintain the level of the liquid refrigerant at level 32.

A mixture of mix and air enters the freezing chamber 20 through intake 34 and the heat transfer from the mix causes the refrigerant within the chamber 30 to boil. The faster the freezing desired, the more vigorous the ammonia will boil. Free boiling is achieved, and due to the level 32 of the refrigerant, an enlarged boiling surface is attained, which allows for less surging in the upper part of the freezer 10. Any surging of the liquid refrigerant that may occur in the space 36 above the level 32 is prevented from entering the dome 18 by means of the baffle plate 38 consisting of the upper surface of the casing 16, which is apertured as at 40 to permit the moist cool vapor to enter into contact with the coils 24.

A suction tube 42 apertured as at 44 is provided for drawing off this cool moist vapor and is connected by means of a conduit 46 to the control valve 26 where the condensed refrigerant can be delivered back to the coils 24. Of course, a compressor of suitable capacity is provided as needed for compressing the vapor sucked off by the suction pipe 42. The suction pipe 42 is in itself a final baffle to the entrance of liquid refrigerant into the suction line 42. A conventional oil trap 48 is provided to drain any oil that may accumulate in the casing 16 during the functioning of the continuous freezer 10.

The mix and air that is introduced through the inlet 34 is pumped inside the freezing chamber 20 and outside of the drum wall 22 to permit the freezing and the enfolding of the air into the mix. When flavors with fruits or nuts and the like are made, the fruit injector to be hereinafter described is operated, and the stiffly frozen product slowly circulates through the T 50 and back into the front portion of the freezer chamber 20 and finally out of the outlet port 52 and into the package.

The front lid 54 of the freezer chamber 20 is sealed with an O-ring 56 and is removable for cleaning. The back lid 58 is fitted with a bearing 60 for the shaft 62 of the drum 22 and is provided with an O-ring seal 64. The drive shaft 62 is equipped with a double keyway or a squared shoulder as may be desired to fit the drive mechanism of the continuous freezer 10.

Referring now more particularly to Figures 1, 3, 4 and 5, it will be seen that the fruit injector generally designated by reference numeral 66 is attached to the front cover 54 of the freezer 10 and an opening 68 is provided in the lid 54 to permit passage of the auger or worm 70 to extend into the connection 50 which is detachably secured, as at 72, to the lid 54. The worm or auger 70 is attached to the drum 22 and is rotated therewith, and an end bearing 74 is carried by the fitting to act as an end support for the drum 22 and auger 70.

The T or fitting 50 is closed by the bearing 74 which functions as an end plate and is so arranged that the auger 70 just clears the lower portion of the T 50 and leaves a space in the upper section. This arrangement induces circulation of the product being processed, and fruit, nuts or other flavoring enters through the chamber 76 and is gently mixed and frozen in the space 78 as well as in the freezing chamber 20.

Attached to the cylindrical casing forming the chamber 76 is an upper plate 80 which has a threaded shaft 82 attached thereto. A lower plate 84 carrying tubular containers 86 and 88 is held to the upper plate 80 by means of a thrust bearing 90 and a nut 92. Furthermore, a roller bearing 94 as well as clamps 96 are provided to compensate for any give or springing of the plates 80 and 84 from the center to the edges thereof. O-rings 98 are used to seal all areas to hold the product in the desired areas during processing.

Apertures 100 and 102 are formed in the tubular containers 86 and 88, respectively, and a lid 104 is provided for detachably closing the tubular container 86. Fruit or nuts are adapted to be placed into the container 86 after removal of the lid 104 and subsequently, the lid 104 is positioned so as to close the tubular container 86.

It is noted that each of the tubular containers 86 and 88 have pistons 106 and 108 mounted therein, and in the operation of this device, the lower plate 84 is rotated so that the now filled chamber 86 is in alignment with the aperture 102 and chamber 76, with the piston 106 in a lowered position.

Connected to the lower ends of the tubular chambers 86 and 88 are conduits 110 and 112 controlled by a three-way rotary valve 114 of conventional construction and fed by an inlet water pipe 116. The inlet water pipe 116 is connected to a source of fluid at sufficient pressure to exceed the pressure in the chamber 78 by 10 lbs. The valve 114 is used to regulate the desired speed of fruit or nut injections by regulating the speed of flow of water into the tubular container 86 or 88 which is in alignment with the chamber 76.

The valve 114 includes a valve body 118 in which a valve member 120 is positioned and has passageways, as at 122, therein, as best seen in Figures 8 and 9, which are adapted to align with the conduits 110 and 112 for connecting the conduits 110 and 112 with the intake passageway 124 in the valve body 118.

A swivel connection, as at 126, of any convenient construction, is provided for the valve 114 with a setscrew 128 holding the connector 126 to the water inlet conduit 116. The valve member 120 may be controlled by a suitable handle 130.

Cords or chains, as at 132 and 134, are connected to the pistons 108 and 110 and have check valves 136 and 138 attached at the lower ends thereof so that when either of the pistons 106 and 108 have reached a raised position, piston 108 being shown in a raised position in Figure 3, the valves 136 and 138 will be actuated, allowing water to pass out of the tubular container 86 and 88, thereby preventing the energy in the water under pressure from raising the pistons 106 and 108 above the lower plate 84 and into the joint between the plates 80 and 84. While the tubular container under the chamber 76 is emptying, the other tubular container may be filled, thus initiating another cycle of operation of the invention.

A needle valve 140 is provided and may be set to attain the desired speed of operation of the pistons 106 and 108 and once set, need not be touched except for further adjustments. The three-way valve 114 may be set to operate either of the pistons 106 or 108 or may be completely shut off. The pistons 106 and 108 when they have attained a raised position and it is desired to rotate the plate 84, may be lowered by manually raising either of the check valves 136 or 138 as may be desired. A handle, not shown, may be provided to aid in the rotation of the plate 84.

As the fruit is pressed up into the chamber 76 by either of the pistons 106 or 108, the worm or auger 70 will mix it with the ice cream and gradually work it back into the freezing chamber 20 where it is further mixed and frozen before it leaves the freezer. It is important that the mix and air pump be flexible yet positively controlled as sherbets should have much less air than ice cream, and some competitive products are high in the quantity of air. The arrangement of air and mix pumps, as is shown in Figures 11 through 13, give positive control even, though the pressure on the freezer may vary.

The mix is pumped from a vat or can through the mix suction line 148 by use of a positive displacement pump 150. The mix is pumped out of the pump exit 152 and into the mixer T 154. Here it is mixed with air from the diaphragm pump 156 through the tube 158 and through check valve 160. The pressure herein is registered on a gauge 162.

A speed reducer assembly, generally indicated by reference numeral 164 is provided to obtain the desired speed range. The variation in speed of the mix pump 150 is accomplished by moving the handle 166 which adjusts the setting of the speed transformer 168 thus changing the speed of the drive 170 driving the pump 150. The speed of the air pump 156 is adjusted independently of the mix pump 150 by adjusting the centering of the lever 172 which adjusts the transformer 174 and changes the speed of the drive 176 of the pump 156.

The belts of the speed changer and drive assembly are automatically kept tight by use of the hinged motor 178 and the hinged speed reducer assembly 180 so that the belts on the speed transformers 168 and 174 are automatically tightened. It is noted that the speed transformers 168 and 174 in themselves are of conventional construction and other means may be utilized to vary the speed of the air pump 156 and mix pump 150 independently of each other to attain the combination hereinbefore defined.

The complete mix pump 156 may be easily removed by removing the four wing nuts indicated at 182. The entire assembly may be mounted on a stainless steel cabinet 184 which may be utilized as a work table for the parts when they are removed for washing.

Further details of the individual conventional speed changer assembly can be seen in Figure 13, where it will be noted that each of the speed transformers functions to vary the position of a floating center section 186 of a double pulley assembly 188 so as to vary the position where the individual belts are engaged. That is, with the floating pulley 186 in a first position, individual belts will occupy the positions designated at 190 and 192, respectively. However, with the floating pulley 186 in a different position, the respective belts will occupy the positions as are indicated at 194 and 196. Inasmuch as the speed of the drives will depend upon the position of the belts due to the differences in diameter of the effective action of the belts, the speed may be easily and readily varied by the movement of the speed transformers 168 and 174 which control the position of the floating center section of the pulley assemblies.

Referring now to Figure 14, it will be noted that herein there is shown a modified form of the invention in which the baffle wall 198 which in itself may be constructed so it will act as a heat interchanger to replace or supplement coils 24 thereof extends transversely across the upper portion of the casing 200 for the refrigerant. No dome, such as the dome 18, is required in this form of the invention, and the coils 202 as well as the suction pipe 204 are positioned above the baffle plate 198. The baffle plate 198 is, of course, provided with apertures 206 therein to permit passage of the cool vapor, and a mix chamber 208 as well as a drum 210 is, of course provided within the refrigerant chamber 200, all of which is encased in a housing 212 provided with suitable insulation 214.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A continuous freezer comprising a housing, a refrigerant casing in said housing, a mix chamber in said refrigerant casing, a mixing drum in said mix chamber with said mix chamber having an inlet and an outlet, said refrigerant casing including an apertured baffle plate, a vapor chamber above said refrigerant casing, liquid refrigerant precooling coils in said vapor chamber, and a vapor suction line in said vapor chamber.

2. A continuous freezer comprising a housing, a refrigerant casing in said housing, a mix chamber in said refrigerant casing, a mixing drum in said mix chamber with said mix chamber having an inlet and an outlet, an auger associated with said mixing drum for delivery of material to a partially frozen mix in said mix chamber, and means for delivery of material to said auger, said refrigerant casing including an apertured baffle plate, a vapor chamber above said refrigerant casing, liquid refrigerant precooling coils in said vapor chamber, and a vapor suction line in said vapor chamber.

3. A continuous freezer comprising a housing, a refrigerant casing in said housing, a mix chamber in said refrigerant casing, a mixing drum in said mix chamber with said mix chamber having an inlet and an outlet, an auger associated with said mixing drum for delivery of material to a partially frozen mix in said mix chamber, and means for delivery of material to said auger, said refrigerant casing including an apertured baffle plate, a vapor chamber above said refrigerant casing, liquid refrigerant precooling coils in said vapor chamber, and a vapor suction line in said vapor chamber, and variable means for introducing separately variable quantities of air and mix through said inlet to said mix chamber.

4. A continuous freezer comprising a housing, a refrigerant casing in said housing, a mix chamber in said refrigerant casing, a mixing drum in said mix chamber with said mix chamber having an inlet and an outlet, an auger associated with said mixing drum for delivery of material to a partially frozen mix in said mix chamber, and means for delivery of material to said auger, said means including an upper disk member communicating with said auger and having apertures therethrough, a lower disk member rotatably depending from said upper disk member and having openings therein adapted to be aligned with said apertures in said upper disk member, tubular containers in alignment with said openings depending from said lower disk member, means for introducing material to said containers, and hydraulic means for forcing material from said containers through one of said apertures in said upper disk member.

5. A continuous freezer comprising a housing, a refrigerant casing in said housing, a mix chamber in said refrigerant casing, a mixing drum in said mix chamber with said mix chamber having an inlet and an outlet, an auger associated with said mixing drum for delivery of material to a partially frozen mix in said mix chamber, and means for delivery of material to said auger, said means including an upper disk member communicating with said auger and having apertures therethrough, a lower disk member rotatably depending from said upper disk member and having openings therein adapted to be aligned with said apertures in said upper disk member, tubular containers in alignment with said openings depending from said lower disk member, means for introducing material to said containers, and hydraulic means for forcing material from said containers through one of said apertures in said upper disk, said hydraulic means comprising hydraulically operated pistons in said containers, check valves in said containers, and flexible members connecting said check valves to said pistons.

6. A continuous freezer comprising a housing, a refrigerant casing in said housing, a mix chamber in said refrigerant casing, a mixing drum in said mix chamber with said mix chamber having an inlet and an outlet, an auger associated with said mixing drum for delivery of material to a partially frozen mix in said mix chamber, and means for delivery of material to said auger, said means including an upper disk member communicating with said auger and having apertures therethrough, a lower disk member rotatably depending from said upper disk member and having openings therein adapted to be aligned with said apertures in said upper disk member, tubular containers in alignment with said openings depending from said lower disk member, means for introducing material to said containers, and hydraulic means for forcing material from said containers through one of said apertures in said upper disk member, and variable means for introducing separately variable quantities of air and mix through said inlet to said mix chamber.

7. A continuous freezer comprising a housing, a refrigerant casing in said housing, a mix chamber in said refrigerant casing, a mixing drum in said mix chamber with said mix chamber having an inlet and an outlet, an auger associated with said mixing drum for delivery of material to a partially frozen mix in said mix chamber, and means for delivery of material to said auger, said means including an upper disk member communicating with said auger and having apertures therethrough, a lower disk member rotatably depending from said upper disk member and having openings therein adapted to be aligned with said apertures in said upper disk member, tubular containers in alignment with said openings depending from said lower disk member, means for introducing material to said containers, and hydraulic means for forcing material from said containers through one of said apertures in said upper disk member, said refrigerant casing including an apertured baffle plate, a vapor chamber above said refrigerant casing, liquid refrigerant precooling coils in said vapor chamber, and a vapor suction line in said vapor chamber.

8. A continuous freezer comprising a housing, a refrigerant casing in said housing, a mix chamber in said refrigerant casing, a mixing drum in said mix chamber with said mix chamber having an inlet and an outlet, an auger associated with said mixing drum for delivery of material to a partially frozen mix in said mix chamber, and means for delivery of material to said auger, said means including an upper disk member communicating with said auger and having apertures therethrough, a lower disk member rotatably depending from said upper disk member and having openings therein adapted to be aligned with said apertures in said upper disk member, tubular containers in alignment with said openings depending from said lower disk member, means for introducing material to said containers, and hydraulic means for forcing material from said containers through one of said apertures in said upper disk, said hydraulic means comprising hydraulically operated pistons in said containers, check valves in said containers, and flexible members connecting said check valves to said pistons, and variable means for introducing separately variable quantities of air and mix through said inlet to said mix chamber.

9. A continuous freezer comprising a housing, a refrigerant casing in said housing, a mix chamber in said refrigerant casing, a mixing drum in said mix chamber with said mix chamber having an inlet and an outlet, an auger associated with said mixing drum for delivery of material to a partially frozen mix in said mix chamber, and means for delivery of material to said auger, said means including an upper disk member communicating with said auger and having apertures therethrough, a lower disk member rotatably depending from said upper disk member and having openings therein adapted to be aligned with said apertures in said upper disk member, tubular containers in alignment with said openings depending from said lower disk member, means for introducing material to said containers, and hydraulic means for forcing material from said containers through one of said apertures in said upper disk, said hydraulic means comprising hydraulically operated pistons in said containers, check valves in said containers, and flexible members connecting said check valves to said pistons, and variable means for introducing separately variable quantities of air and mix through said inlet to said mix chamber, said refrigerant casing including an apertured baffle plate, a vapor chamber above said refrigerant casing, liquid refrigerant precooling coils in said vapor chamber, and a vapor suction line in said vapor chamber.

10. For use in combination with a continuous feeder, material feeding means including an upper disk member having apertures therethrough, a lower disk member rotatably depending from said upper disk member and having openings therein adapted to be aligned with said apertures in said upper disk member, tubular containers in alignment with said openings depending from said lower disk member, means for introducing material to said containers, and hydraulic means for forcing material from said containers through one of said apertures in said upper disk member.

11. For use in combination with a continuous feeder, material feeding means including an upper disk member having apertures therethrough, a lower disk member rotatably depending from said upper disk member and having openings therein adapted to be aligned with said apertures in said upper disk member, tubular containers in alignment with said openings depending from said lower disk member, means for introducing material to said containers, and hydraulic means for forcing material from said containers through one of said apertures in said upper disk member, said hydraulic means comprising hydraulically operated pistons in said containers, check valves in said containers, and flexible members connecting said check valves to said pistons.

References Cited in the file of this patent

UNITED STATES PATENTS

| 2,013,018 | Vogt | Sept. 3, 1935 |
| 2,015,493 | Morrow | Sept. 24, 1935 |
| 2,023,607 | Miller | Dec. 10, 1935 |
| 2,210,366 | Godfrey | Aug. 6, 1940 |
| 2,211,387 | Routh | Aug. 13, 1940 |
| 2,402,931 | Thomas | June 25, 1946 |